United States Patent [19]

Harada

[11] Patent Number: 5,327,464
[45] Date of Patent: Jul. 5, 1994

[54] DISPERSAL SIGNAL REMOVING APPARATUS

[75] Inventor: Shigeru Harada, Tokyo, Japan
[73] Assignee: Sony Corporation, Tokyo, Japan
[21] Appl. No.: 937,760
[22] Filed: Sep. 1, 1992
[30] Foreign Application Priority Data
  Sep. 6, 1991 [JP] Japan .................. 3-254336
[51] Int. Cl.5 .......................... H03D 1/06; H04B 1/10
[52] U.S. Cl. ..................... 375/99; 328/162; 328/165; 455/296
[58] Field of Search ............... 375/34, 58, 99; 328/162, 165, 167; 358/167, 187; 455/296, 304, 305, 306

[56] References Cited
U.S. PATENT DOCUMENTS
  4,314,377  2/1982  Kondo et al. ................ 328/165
  4,577,342  3/1986  Naito ........................... 455/305
  4,910,799  3/1990  Takayama .................... 455/304

Primary Examiner—Stephen Chin
Assistant Examiner—Don N. Vo
Attorney, Agent, or Firm—William S. Frommer; Alvin Sinderbrand

[57] ABSTRACT

A dispersal signal generating apparatus which removes a dispersal signal effectively and rapidly from an input video signal. A dispersal signal component is first detected from an input reception signal to which only soft clamping processing has been applied, and a cancel signal is generated in accordance with the thus detected dispersal signal component. After the detection of the dispersal signal, processing of removing the dispersal signal is performed by both of a dispersal canceler and a hard clamp circuit.

5 Claims, 10 Drawing Sheets

FIG. 1

F I G. 2(a) RECEPTION SIGNAL

F I G. 2(b) SOFT CLAMP OUTPUT

F I G. 2(c) HARD CLAMP OUTPUT

F I G. 2(d) DISPERSAL DETECTION SIGNAL Dd (AMPLITUDE)

F I G. 2(e) DISPERSAL DETECTION SIGNAL Dd (PHASE)

F I G. 2(f) CANCEL SIGNAL Sc

F I G. 2(g) DISPERSAL REMOVAL OUTPUT

DISPERSAL SIGNAL REMOVING APPARATUS

BACKGROUND OF THE INVENTION

1. Field of the Invention

This invention relates to a dispersal signal removing apparatus which can remove a dispersal signal from a reception signal which has a dispersal signal component therein.

2. Description of the Relates Art

A signal such as, for example, a video signal which is transmitted by way of a broadcasting satellite or a communication satellite is normally superimposed with an energy dispersal signal (hereinafter referred to merely as dispersal signal) of a triangular waveform in order to disperse the energy of satellite radio waves so that it may not concentrate upon a particular frequency or frequencies within a transmission band. If a dispersal signal remains on a video signal, then it will appear as a plane flicker on a screen. Therefore, it is necessary to remove, upon reception of a video signal, a dispersal signal from the video signal.

A dispersal signal is conventionally removed using a clamp circuit or using both of a clamp circuit and a dispersal canceler. Means for removing a dispersal signal is described first.

When, for example, a MUSE signal is to be broadcast using a broadcasting satellite, such a dispersal signal as shown by a curve (b) in FIG. 8 is superimposed on a MUSE signal shown by another curve (a) in FIG. 8. The dispersal signal is a triangular wave signal which presents its lowest level at the center of a first field of the MUSE signal and presents its highest level at the center of a second field of the MUSE signal, and the difference in frequency between the black and white levels when the MUSE signal is in an FM modulated form is 10.2 MHz while the peak-to-peak difference in frequency of the dispersal signal is 600 KHz. Consequently, the energy dispersal amount is 5.9%.

Meanwhile, a dispersal signal when the MUSE signal is transmitted using a communication satellite is shown by a curve (d) in FIG. 8. In particular, while the difference in frequency between the black and white levels when the MUSE signal is in an FM modulated form is 8.5 MHz, the peak-to-peak difference in frequency of the dispersal signal is 2.2 MHz. Consequently, the energy dispersal amount is 26%.

Figure 9:
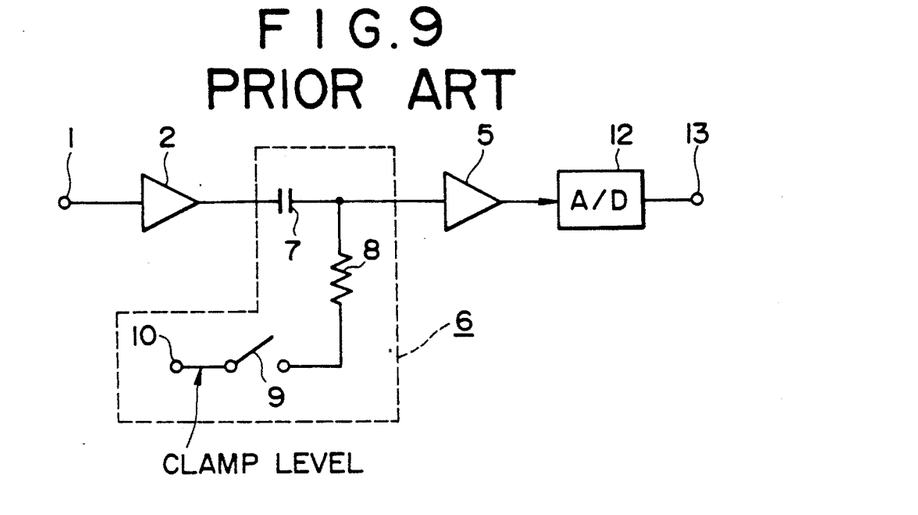
FIG. 9 is a block diagram showing a conventional dispersal signal removing apparatus.

Thus, when a dispersal signal having such a small amplitude as seen from the curve (b) of FIG. 8 is superimposed on the MUSE signal, the dispersal signal is normally removed using such a clamp circuit 6 as shown in FIG. 9. Referring to FIG. 9, an FM modulated signal of a MUSE signal overlapped with a dispersal signal is first demodulated by an FM demodulator not shown and then supplied from an input terminal 1 to the clamp circuit 6 by way of a buffer amplifier 2. The output of the clamp circuit 6 is supplied to an analog to digital (A/D) converter 12 by way of a buffer amplifier 5, and the output of the analog to digital converter 12 is supplied from an output terminal 13 to a decoder not shown.

Figure 10:
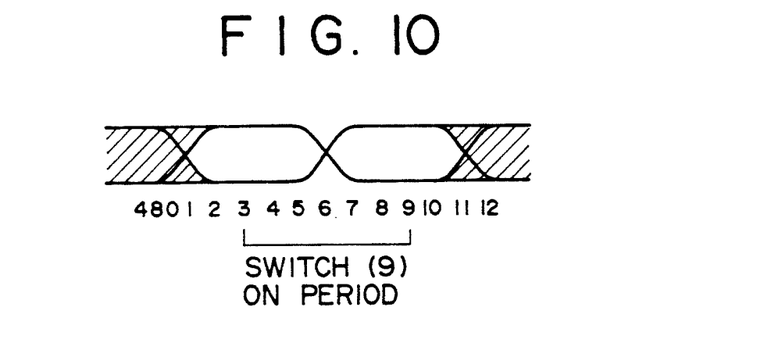
FIG. 10 is a waveform diagram illustrating a MUSE signal.

The clamp circuit 6 includes a capacitor 7 interposed in series between the buffer amplifiers 2 and 5, and a series circuit of a resistor 8 and an on/off switch 9 connected between a junction between the capacitor 7 and the buffer amplifier 5 and the input terminal 10 to which a clamp voltage which has a level equal to one half a maximum level of the video signal is supplied. The on/off switch 9 is controlled so that it presents an on-state for a period of time of the sample numbers 3 to 9 within a period of a horizontal synchronizing signal (for a HD period) of a MUSE signal shown in FIG. 10 but presents an off-state for any other period of time.

A residual signal which is the output of the clamp circuit 6 when the amplitude of the dispersal signal superimposed on the MUSE signal is 600 KHz in frequency difference upon FM modulation as shown by the curve (b) of FIG. 8 is shown by a curve (c) in FIG. 8. The amplitude of the residual signal corresponds to −52 dB or so when the amplitude from the black level to the white level is 0 dB, and accordingly, such a noise as a plane flicker is not produced on a reproduced image due to a dispersal signal removing action of the clamp circuit 6.

Figure 11:
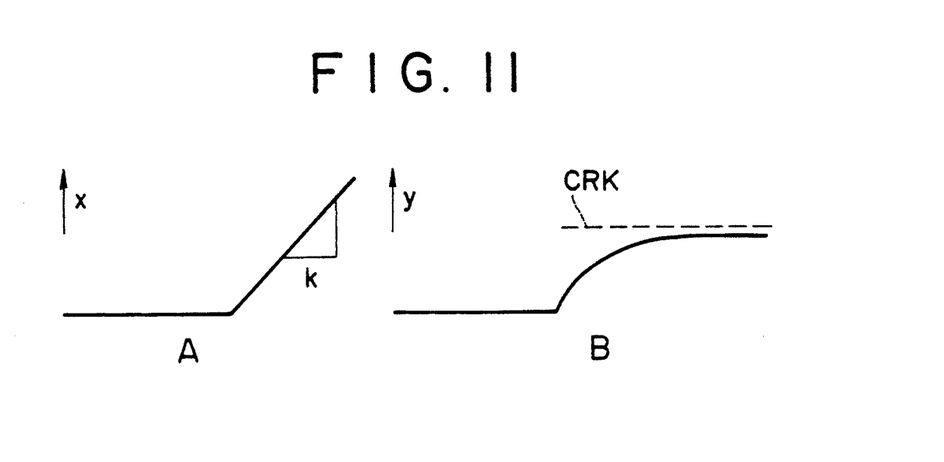
FIG. 11 is a waveform diagram illustrating a dispersal signal and a residual signal.

It is to be noted that, when the slope of the dispersal signal x is represented by K as seen from a curve A of FIG. 11, the capacitance of the capacitor 7 of the clamp circuit 6 by C and the resistance of the resistor 8 by R, the residual signal y shown by another curve B in FIG. 11 is given by $$y = CRK\{1 - \exp(-t/CR)\}$$

On the other hand, when the dispersal signal has a great amplitude (2.2 MHz) as seen from the curve (d) in FIG. 8, the residual signal which is the output of the clamp circuit 6 presents such a waveform as shown by a curve (e) in FIG. 8. The residual signal corresponds to −38 dB or so when the amplitude from the black level to the white level is 0 dB, and accordingly, the residual signal makes a flicker noise which has an influence upon a reproduced image.

Figure 12:
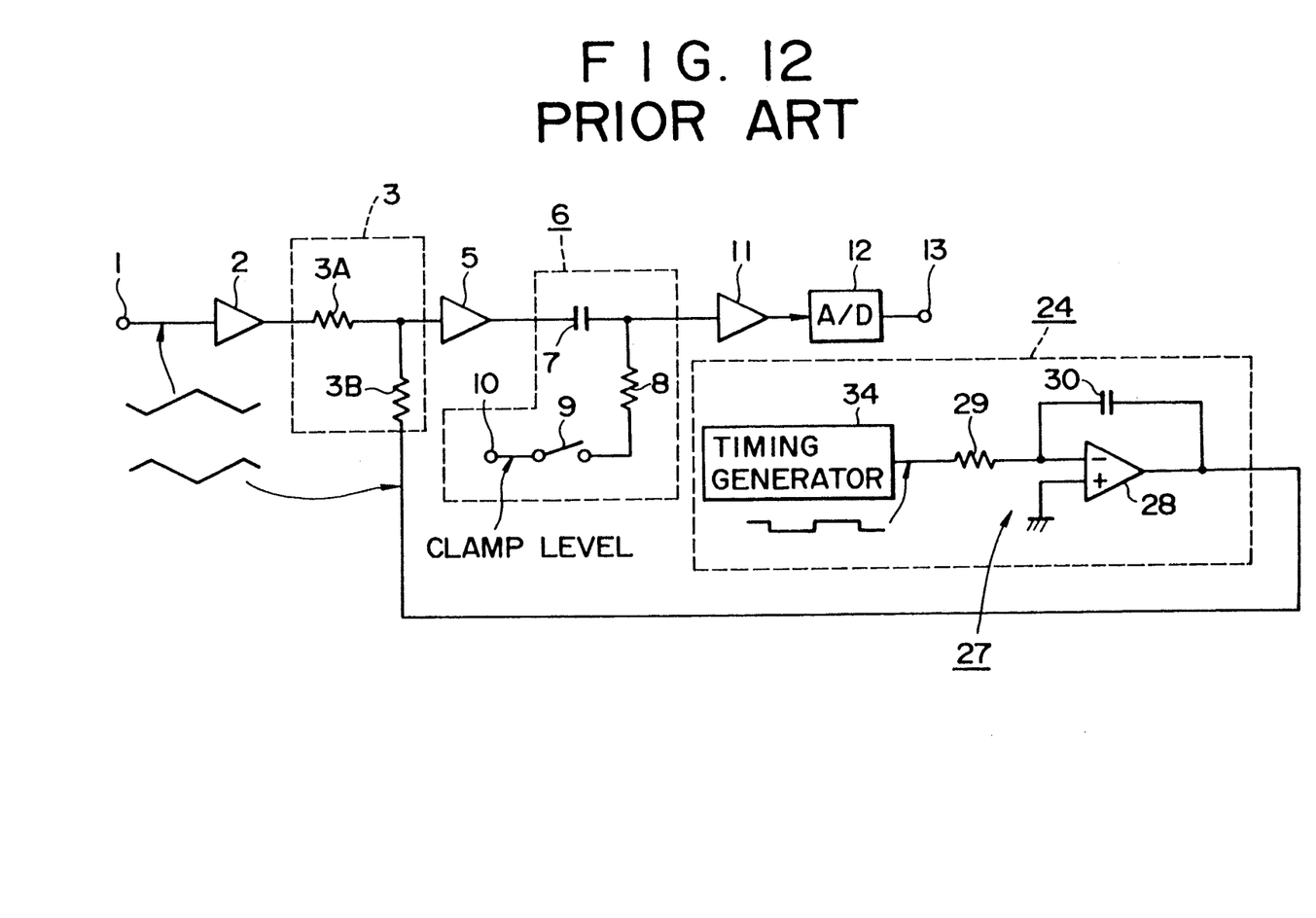
FIG. 12 is a block diagram showing another conventional dispersal signal removing apparatus.

When the dispersal signal level is high to a certain degree, a dispersal canceler is used together with a clamp circuit as shown in FIG. 12 in order to remove the dispersal signal.

Referring to FIG. 12, an FM modulated signal of a MUSE signal superimposed with a dispersal signal is demodulated by an FM demodulator not shown and is inputted from an input terminal 1 by way of a buffer amplifier 2 to a dispersal canceler 3 which is formed from a pair of resistors 3A and 3B. The output of the dispersal canceler 3 is inputted to a clamp circuit 6 similar to the clamp circuit 6 shown in FIG. 9 by way of a buffer amplifier 5. The output of the clamp circuit 6 is supplied by way of another buffer amplifier 11 to and digitally coded by an analog to digital converter 12, the output of which is supplied from an output terminal 13 to a decoder not shown.

A cancel signal generating circuit 24 is connected to an end of the resistor 3B of the dispersal canceler 3 remote from the end at which the resistor 3B is connected to a junction between the other resistor 3A and the buffer amplifier 5. The cancel signal generating circuit 24 is constituted from a timing signal generator 34 and an integrating circuit 27 to which a timing signal is supplied from the timing signal generator 34. The integrating circuit 27 is constituted from an operational amplifier 28 having its non-negated input terminal grounded, an input side resistor 29 connected to the negated input terminal of the operational amplifier 28, and a capacitor 30 connected between the output terminal and the negated input terminal of the operational amplifier 28.

In the cancel signal generating circuit 24, a timing signal of a rectangular waveform the phase of which is reversed for each field is generated from the timing signal generator 34 and is supplied to the integrating circuit 27, at which it is integrated to generate a cancel signal which is opposite in phase to the dispersal signal of the triangular waveform described above. The cancel signal thus generated is supplied to the resistor 3B of the dispersal canceler 3. Consequently, the dispersal signal of the input signal is removed completely or attenuated.

While the conventional means for removing a dispersal signal either includes a clamp circuit or includes both of a clamp circuit and a dispersal canceler in this manner, a dispersal signal having a great amplitude cannot be removed effectively by the means which only includes a clamp circuit.

On the other hand, the means including both of a clamp circuit and a dispersal canceler cannot cope with a reception signal having a dispersal signal component having a different frequency or amplitude because the cancel signal is fixed, and accordingly, it has a problem that it is necessary to vary the frequency or amplitude of a cancel signal to be generated, for example, by manual operation depending upon a type of a reception signal.

For example, in the high definition television broadcasting which makes use of a broadcasting satellite, the dispersal signal is a triangular wave signal of 30 Hz and the energy dispersal amount is 5.9%, but in the NTSC broadcasting which employs a broadcasting satellite, the dispersal signal is a triangular wave signal of 15 Hz and the energy dispersal amount is 3.5%. Further, in the high definition television broadcasting which makes use of a communication satellite, the dispersal signal is a triangular wave signal of 30 Hz and the energy dispersal amount is 11 to 26% or so.

Thus, a dispersal signal removing apparatus is demanded which can automatically correspond to any of various dispersal signals and remove or attenuate the dispersal signal at least to such a degree at which a flicker noise on a screen is eliminated.

SUMMARY OF THE INVENTION

It is an object of the present invention to provide a dispersal signal removing apparatus which can automatically correspond to any of various dispersal signals and remove or attenuate the dispersal signal at least to such a degree at which a flicker noise on a screen is eliminated.

In order to attain the object, according to the present invention, there is provided a dispersal signal removing apparatus for removing a dispersal signal component from an input reception signal, which comprises soft clamp means for receiving the input reception signal and passing the input reception signal therethrough without removing the dispersal signal component from the input reception signal, hard clamp means for receiving the input reception signal and removing the dispersal signal component from the input reception signal, dispersal signal detecting means for receiving the output of the soft clamp means and detecting the dispersal signal component from the output of the soft clamp means, cancel signal generating means for generating a cancel signal from the dispersal signal component detected by the dispersal signal detecting means, dispersal canceler means for receiving the input reception signal and removing the dispersal signal component from the input reception signal in accordance with the cancel signal from the cancel signal generating means, and switching means for initially coupling the soft clamp means to the dispersal signal detecting means and for disconnecting, in response to detection of the dispersal signal component by the dispersal signal detecting means, the dispersal signal detecting means from the soft clamp means and allowing removal of the dispersal signal component from the input reception signal by the dispersal canceler means and the hard clamp means thereby to produce an output signal of the dispersal signal removing apparatus.

In the dispersal signal removing apparatus, a dispersal signal component of an input reception signal is detected first from the input reception signal to which soft clamping processing has applied, and a cancel signal is generated in accordance with the dispersal signal component thus detected. After the dispersal signal is detected, removing processing of the dispersal signal is performed by both of the dispersal canceler means and the hard clamp means. Consequently, the dispersal canceler means can automatically remove the dispersal signal component from the input reception signal whatever frequency, amplitude or phase the dispersal signal component has, and besides the accuracy in removal of the dispersal signal component is high. Further, since detection of the dispersal signal component is performed from the output of the soft clamp means which passes such dispersal signal component as it is therethrough and little attenuates the same, the dispersal signal detecting means can detect the dispersal signal component very readily. Consequently, an otherwise possible influence of the dispersal signal upon a screen is eliminated almost completely.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
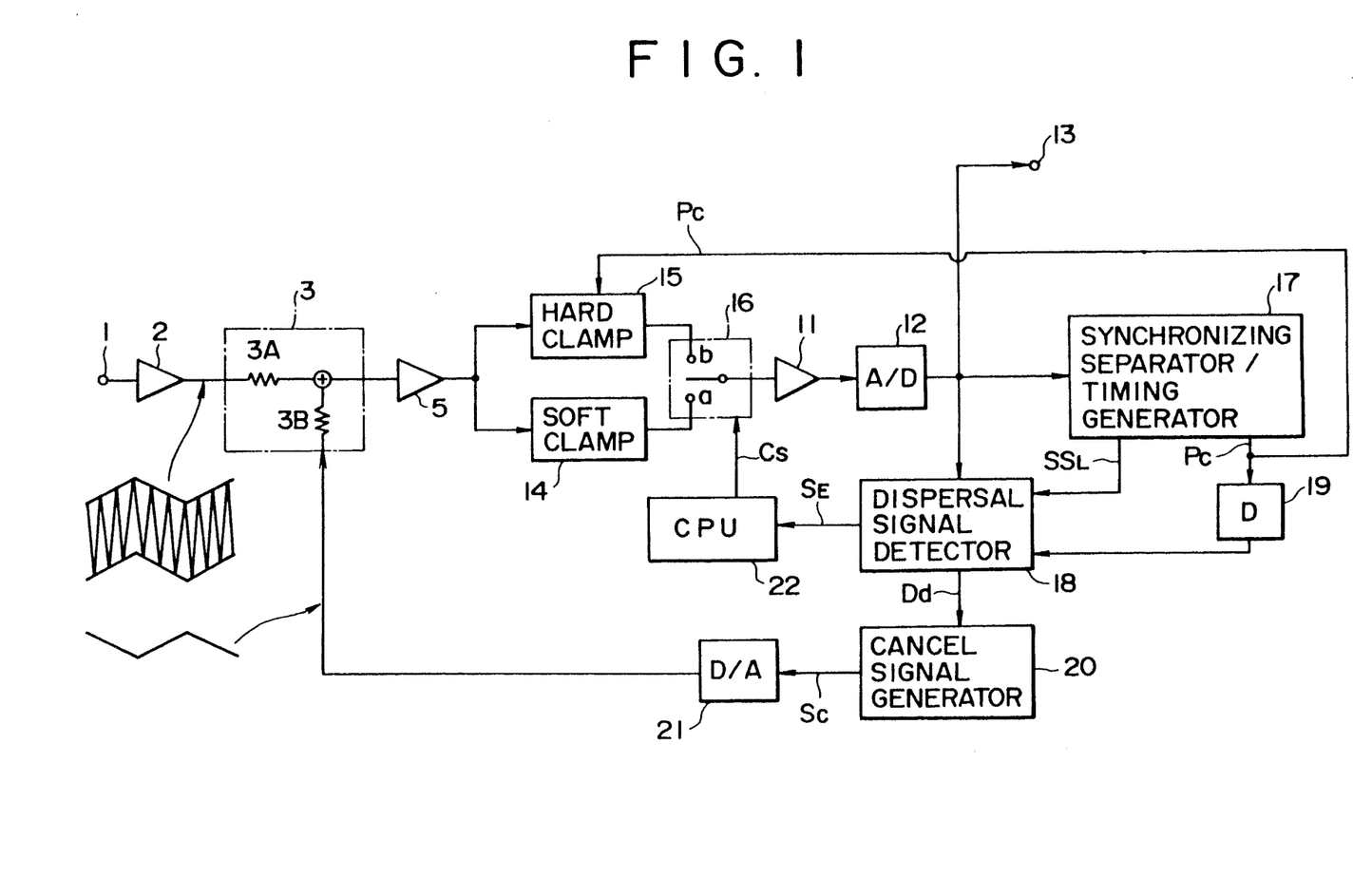
FIG. 1 is a block diagram of a dispersal signal removing apparatus showing a first preferred embodiment of the present invention.

Referring first to FIG. 1, there is shown a dispersal signal removing apparatus to which the present invention is applied. The dispersal signal removing apparatus includes several common components to the conventional dispersal signal removing apparatus shown in FIGS. 9 and 12. The common components are denoted by like reference numerals to those of FIGS. 9 and 12 and overlapping description thereof is omitted herein to avoid redundancy.

Figures 2A, 2B:
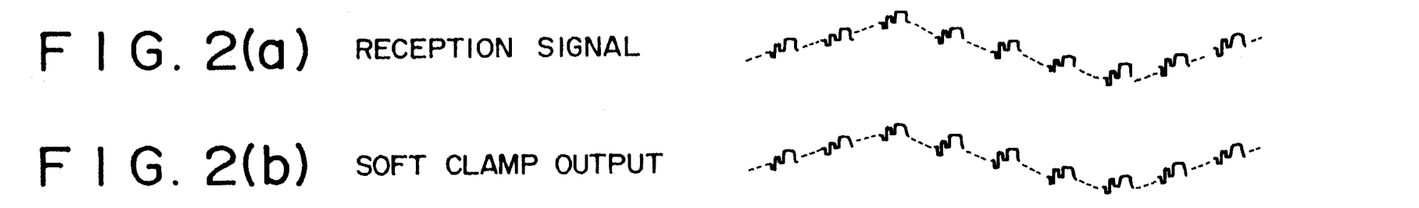
FIGS. 2(a)–2(g) are waveform diagrams showing waveforms at various portions of the dispersal signal removing apparatus shown in FIG. 1.

The dispersal signal removing apparatus has an input terminal 1 to which a video signal is supplied. The video signal is produced by demodulation of an FM modulated reception signal by an FM demodulator and may have such a waveform as shown, for example, by a curve (a) in FIG. 2. The video signal is supplied to a soft clamp circuit 14 or a hard clamp circuit 15 by way of a buffer amplifier 2, a dispersal canceler 3 and a buffer amplifier 5 and further to a buffer amplifier 11 and an analog to digital converter 12 by way of a switching circuit 16.

The digital output of the analog to digital converter 12 is supplied from an output terminal 13 to a decoder not shown, at which it undergoes image reproducing processing. The digital output is inputted also to a synchronizing separating and timing generating circuit 17 and a dispersal signal detecting circuit 18.

The synchronizing separating and timing generating circuit 17 separates a synchronizing signal from the digital video signal supplied thereto, produces a horizontal synchronizing signal, a frame pulse signal and various timing signals from the synchronizing signal and outputs the thus produced signals. Particularly, the synchronizing separating and timing generating circuit 17 outputs a clamp pulse $P_C$ generated in accordance with the horizontal synchronizing signal and another signal $SS_L$ representative of establishment of synchronous locking by a PLL (phase locked loop) circuit to the dispersal signal detecting circuit 18 and outputs the clamp pulse $P_C$ also to the hard clamp circuit 15.

It is to be noted that the clamp pulse $P_C$ is supplied to the dispersal signal detecting circuit 18 by way of a delay circuit 19. This is because it is intended to establish matching in time between that clamp pulse $P_C$ and the clamp pulse $P_C$ supplied to the hard clamp circuit 15 against a delay time which is caused by the analog to digital converter 12 and so forth.

The dispersal signal detecting circuit 18 detects, after a signal $SS_L$ representing that synchronization between the received signal inputted, that is, the output of the analog to digital converter 12 and the receiving apparatus in which the present dispersal signal removing apparatus is incorporated has been established is supplied thereto, the potential for a pedestal period for which a fixed potential is to exist periodically in the reception signal for several tens fields or so in accordance with the timing of a clamp pulse, thereby to allow a dispersal signal component to be obtained.

Thus, the dispersal signal detecting circuit 18 outputs a signal of such a waveform of a dispersal signal component as shown, for example, by a curve (d) in FIG. 2 or another signal which exhibits such an amplitude and a phase corresponding to the waveform of the dispersal signal component as shown by a curve (e) in FIG. 2 as a dispersal detection signal $D_d$. The dispersal detection signal $D_d$ is supplied to the cancel signal generating circuit 20. The cancel signal generating circuit 20 generates such a cancel signal $S_C$ as shown by a curve (f) in FIG. 2 which has an opposite phase to that of the dispersal signal component superimposed on the video signal shown by the curve (a) of FIG. 2. The cancel signal $S_C$ is converted into an analog signal by a digital to analog converter 21 and supplied to the dispersal canceler 3. It is to be noted that a low-pass filter for pulse width modulation may be employed in place of the digital to analog converter 21.

Figure 2C:
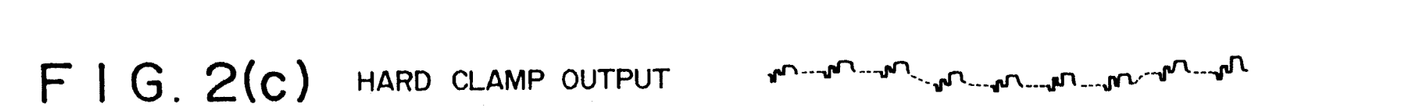
Figure 2D:
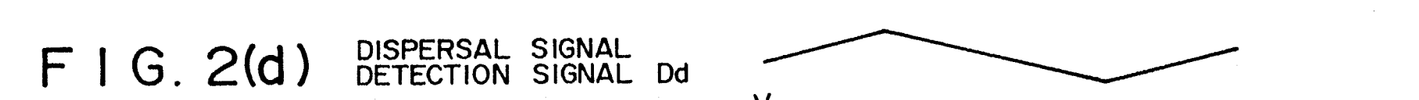
Figure 2E:
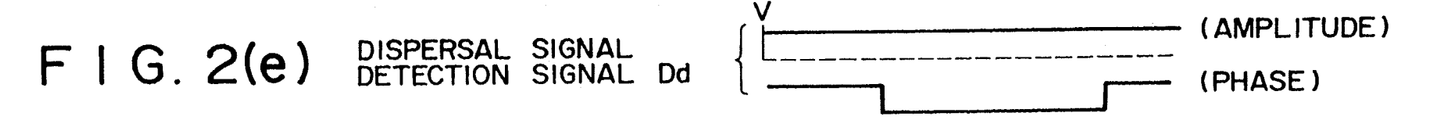
Figure 2F:
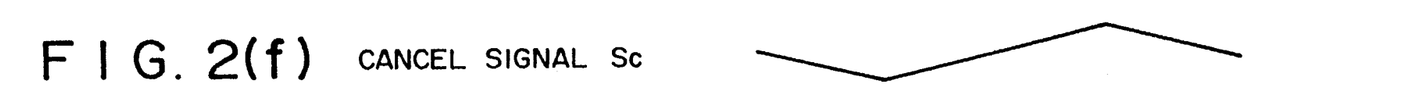

Naturally, the cancel signal $S_C$ may be generated by any of various methods. For example, when the dispersal detection signal $D_d$ is designed to be in the form of a digital code having such a waveform as shown by the curve (d) in FIG. 2, it may be reversed in phase by calculating processing to obtain a cancel signal $S_C$. The cancel signal $S_C$ is supplied to the dispersal canceler 3 by way of the digital to analog converter 21.

Figure 3:
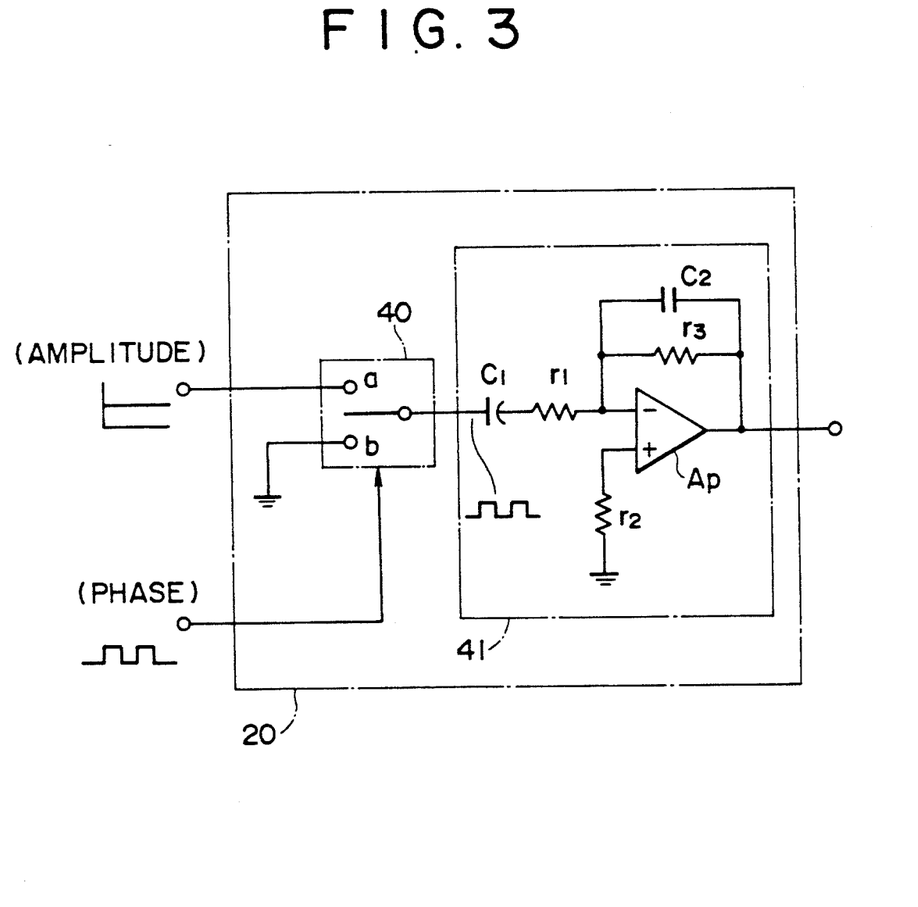
FIG. 3 is a circuit diagram of a cancel signal generating circuit of the dispersal signal removing apparatus shown in FIG. 1.

On the other hand, when the dispersal detection signal $D_d$ is a signal having an amplitude and a phase corresponding to the waveform of the dispersal signal component as shown by the curve (e) in FIG. 2, the cancel signal generating circuit 20 may be formed, for example, from a switch circuit 40 and an integrating circuit 41 as shown in FIG. 3 such that an amplitude voltage supplied to the cancel signal generating circuit 20 is supplied to the terminal a of the switch circuit 40 while the other terminal b is grounded so as to control switching of the switch circuit 40 in response to the phase of the signal supplied thereto. Consequently, a rectangular wave corresponding to a phase and an amplitude of the cancel signal $S_C$ is obtained as an output of the switch circuit 40. Accordingly, if the rectangular wave is integrated by the integrating circuit 41, then a cancel signal $S_C$ of a triangular waveform can be obtained. In this instance, the digital to analog converter 21 at the succeeding stage to the cancel signal generating circuit 20 is unnecessary.

Referring back to FIG. 1, at the dispersal canceler 3 to which the cancel signal $S_C$ generated by the cancel signal generating circuit 20 is supplied, the reception signal and the cancel signal $S_C$ are added to each other at a predetermined rate set in advance by the resistors 3A and 3B (for example, the ratio of the resistance Ra of the resistor 3A to the resistance Rb of the resistor Rb is set to Ra:Rb=1:10) so that the dispersal signal component superimposed on the reception signal supplied from the input terminal 1 may be attenuated or removed.

The dispersal signal detecting circuit 18 further outputs, at a point of time when its detecting operation is completed, a detection end signal $S_E$ to a CPU (central processing unit) 22. The CPU 22 generates a switching control signal $C_S$ in response to the input of the detection end signal $S_E$ to switch the connecting terminal of the switching circuit 16 from the terminal a to the terminal b as hereinafter described.

Figure 4:
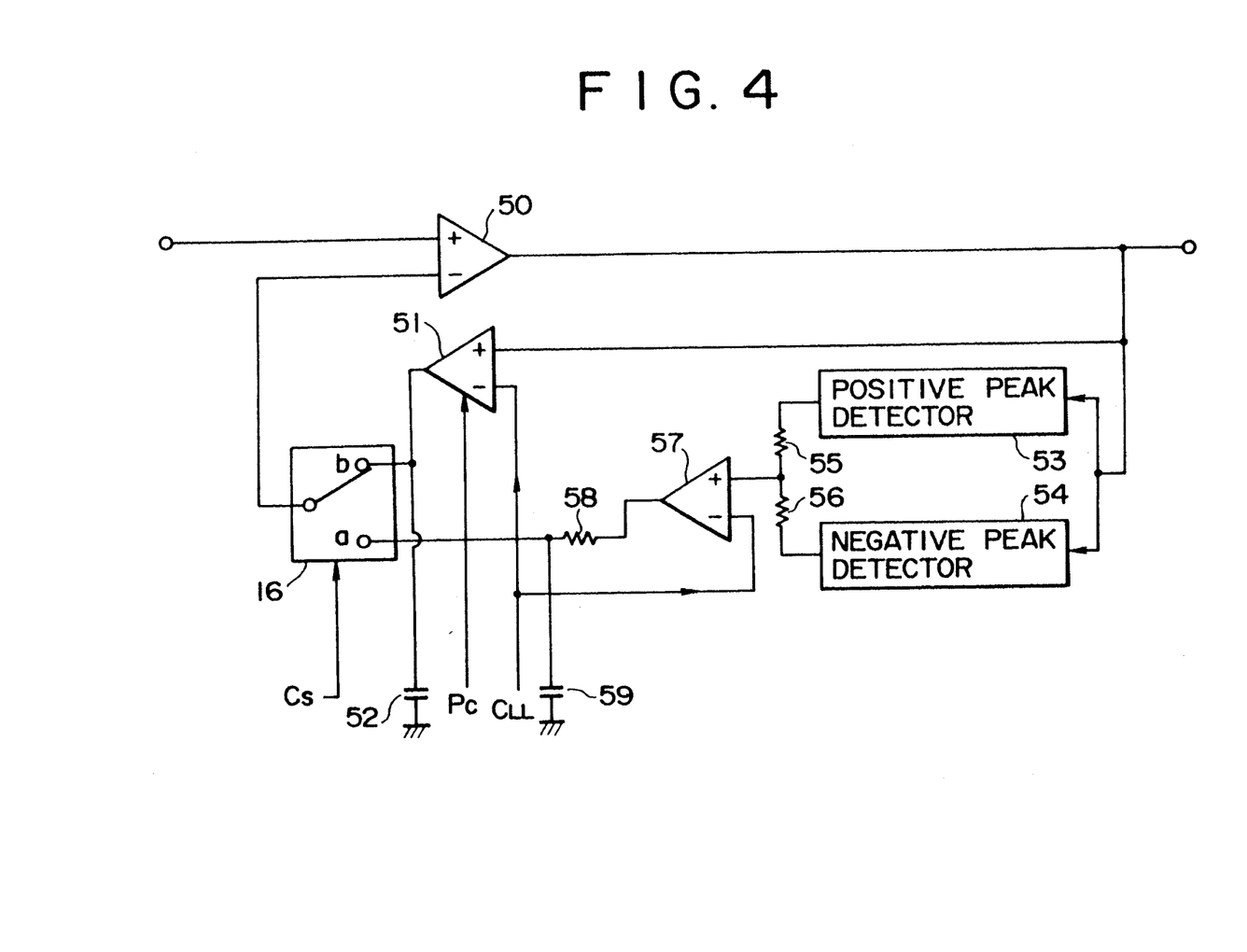
FIG. 4 is a circuit diagram of a soft clamp circuit, a hard clamp circuit and a switching circuit of the dispersal signal removing apparatus shown in FIG. 1.

The soft clamp circuit 14, hard clamp circuit 15 and switching circuit 16 may be constructed in such a manner as shown, for example, in FIG. 4. Referring to FIG. 4, the circuit shown includes a subtracting circuit 50, a comparator 51 for comparing the output of the subtracting circuit 50 with a clamp reference voltage $C_{LL}$ at a timing at which a clamp pulse $P_C$ is supplied, and a capacitor 52 for obtaining a predetermined time constant. The circuit system formed from the subtracting circuit 50, comparator 51 and capacitor 52 when the switching circuit 16 is connected to the contact b functions as the hard clamp circuit 15.

The circuit shown in FIG. 4 further includes a positive peak detecting circuit 53 for detecting a positive peak voltage from the output of the subtracting circuit 50, a negative peak detecting circuit 54 for detecting a negative peak voltage from the output of the subtracting circuit 50, a pair of resistors 55 and 56 for obtaining a center voltage between the positive and negative peak voltages detected by the positive and negative peak voltage detecting circuits 53 and 54, a comparator 57 for comparing the center voltage obtained from the resistors 55 and 56 with the clamp reference voltage $C_{LL}$, and a resistor 58 and a capacitor 59 for obtaining a predetermined time constant which is longer than that of the hard clamp circuit 15. The circuit system formed from the positive and negative peak detecting circuits 53 and 54, resistors 55 and 56, comparator 57, resistor 58 and capacitor 59 when the switching circuit 16 is connected to the contact a functions as the soft clamp circuit 14.

Referring back again to FIG. 1, here, the hard clamp circuit 15 is used as so-called pedestal clamp means and has a dc transmission rate substantially equal to 100%. Accordingly, if a reception signal containing a dispersal signal component therein as shown by the curve (a) in FIG. 2 is inputted to the hard clamp circuit 15, then a signal wherein the dispersal signal component is attenuated to some degree as shown by a curve (c) in FIG. 2 is outputted from the hard clamp circuit 15. However, the attenuation of a dispersal signal by the hard clamp circuit 15 is considered to be 30 dB or so to the utmost.

On the other hand, the soft clamp circuit 14 has a long time constant set in advance by the resistor 58 and the capacitor 59 and accordingly effects clamping for a very low frequency (almost only dc component) which is lower than, for example, 15 Hz to reduce a dc variation of the input signal to the analog to digital converter 12 by an APT (average picture level) variation of the input video signal, but has a dc transmission rate almost equal to zero for a frequency equal to or higher than 15 Hz. Consequently, if a reception signal containing a dispersal signal component therein as shown by the curve (a) in FIG. 2 is inputted to the soft clamp circuit 14, the output of the soft clamp circuit 14 exhibits such a waveform as shown by a curve (b) in FIG. 2. Thus, also the superimposed dispersal signal component is outputted as it is.

Figure 5:
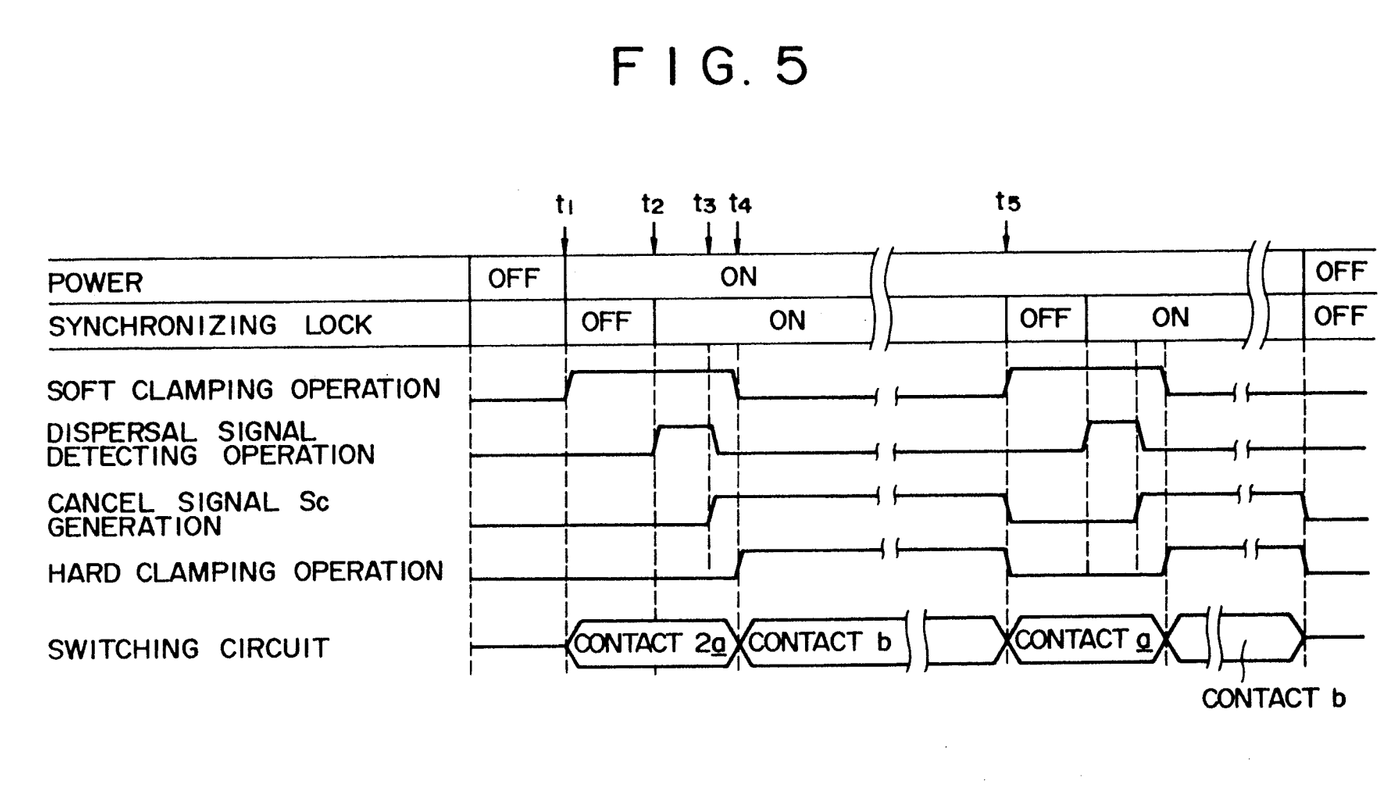
FIG. 5 is a waveform diagram illustrating operation timings of the dispersal signal removing apparatus shown in FIG. 1.

Operation of the dispersal signal removing apparatus of the present embodiment having such a construction as described above is described subsequently with reference to FIG. 5.

The power supply to the receiving apparatus is first made available at the point of time $t_1$. In this instance, since a switching control signal $C_S$ is not supplied from the CPU 22 to the switching circuit 16, the switching circuit 16 is connected to the contact a. Further, a cancel signal $S_C$ is not generated from the cancel signal generating circuit 20. Accordingly, a reception signal from the input terminal 1 passes through the dispersal canceler 3 as it is without having a dispersal signal component thereof attenuated so that it is inputted to the soft clamp circuit 14. However, as described above, the dispersal signal component is not attenuated by the soft clamp circuit 14, either (refer to the curve (b) in FIG. 2).

The output of the soft clamp circuit 14 is supplied, after analog to digital conversion thereof, to the dispersal signal detecting circuit 18. The dispersal signal detecting circuit 18 thus starts, at the point of time $t_2$ when synchronizing locking of the receiving apparatus is established, its operation of detecting the dispersal signal component from within the reception signal supplied thereto.

Then, when the detection of the dispersal signal component is completed at the point of time $t_3$, the dispersal signal detecting circuit 18 outputs a detection end signal $S_E$ to the CPU 22 and outputs a dispersal detection signal $D_d$ to the cancel signal generating circuit 20. In response to the dispersal detection signal $D_d$, the cancel signal generating circuit 20 generates a cancel signal $S_C$, which is supplied to the dispersal canceler 3. Consequently, the dispersal canceler 3 performs its operation of removing the dispersal signal component.

It is to be noted that, after completion of the dispersal detecting operation of the dispersal signal detecting circuit 18, the cancel signal generating circuit 20 must supply the cancel signal $S_C$ continuously to the dispersal canceler 3 until the power supply is stopped or the source of the reception signal is switched, and this may be achieved by various means. For example, digital data of the waveform of the cancel signal $S_C$ generated may be stored into an internal RAM so that the data may be successively outputted from the internal RAM. Or when the cancel signal generating circuit 20 is constructed in such a manner as shown in FIG. 3, for example, the dispersal detection signal $D_d$ from the dispersal signal generating circuit 18 may be successively supplied to the cancel signal generating circuit 20.

Figure 2G:
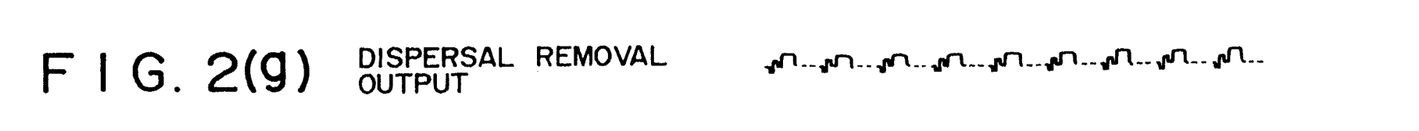

Meanwhile, when the detecting end signal $S_E$ is inputted at the point of time $t_3$, the CPU 22 starts outputting of a switching control signal $C_S$, for example, at the point of time $t_4$ thereby to connect the switching circuit 16 to the contact b. Accordingly, after the point of time $t_4$, the dispersal signal component of the reception signal from the input terminal 1 is first attenuated by the dispersal canceler 3, and then the dispersal signal component is attenuated further by the hard clamp circuit 15. Consequently, the output of the hard clamp circuit 15 exhibits, after the point of time $t_4$, such a waveform from which the dispersal signal component has been removed substantially completely as shown by a curve (g) in FIG. 2.

The signal from which the dispersal signal component has been removed is supplied by way of the analog to digital converter 12 to the decoder not shown, at which image reproducing processing thereof is performed so that the signal is outputted on the screen. Naturally, the situation is eliminated that the picture quality is deteriorated by a plane flicker caused by a dispersal signal.

It is to be noted that, when the broadcasting channel is switched, for example, at the point of time to change the reception source, synchronizing locking is first established and then an operation of detecting a dispersal signal and an operation of generating a cancel signal are performed similarly, whereafter switching processing between the soft clamp circuit 14 and the hard clamp circuit 15 is performed to perform removal of a dispersal signal.

As described above, in the dispersal signal removing apparatus of the present embodiment, since a cancel signal is first generated in accordance with a frequency, an amplitude, a phase or the like of a dispersal signal detected from a reception signal, the dispersal signal component can be removed automatically from the input reception signal of whatever type the input reception signal is. Further, since removal of a dispersal signal is performed by both of the dispersal canceler 3 and the hard clamp circuit 15, removal of a dispersal signal component having a comparatively great amplitude can be realized with such a high degree of accuracy that a plane flicker does not appear on the screen.

Further, since the operation of the dispersal signal detecting circuit 18 to detect a dispersal signal component is performed using a reception signal which is in a condition wherein the dispersal signal component thereof is not attenuated at all (only soft clamping processing is performed), the dispersal signal component can be detected very quickly with a high degree of accuracy. For example, while data of a reception signal for which such hard clamping as seen from the curve (c) in FIG. 2 has been performed must be sampled for a period of time of several tens fields or so in order to detect a dispersal signal component, with the dispersal signal removing apparatus of the present embodiment, a dispersal signal component can be detected for a period of time of several tens fields or so.

Further, by applying soft clamping to a reception signal, synchronizing locking can be achieved rapidly after the power supply is made available. From those facts, the dispersal signal removing apparatus of the present embodiment can realize reduction of the time, for example, from the point of time at which the power supply is made available in FIG. 5 (point of time $t_1$) to the point of time at which actual removal of a dispersal signal component is started (point of time $t_4$) to about 0.5 seconds. Since the removal of the dispersal signal can be started rapidly in this manner, it will hardly occur that a viewer feels a plane flicker for a little while immediately after the power supply is made available.

Figure 6:
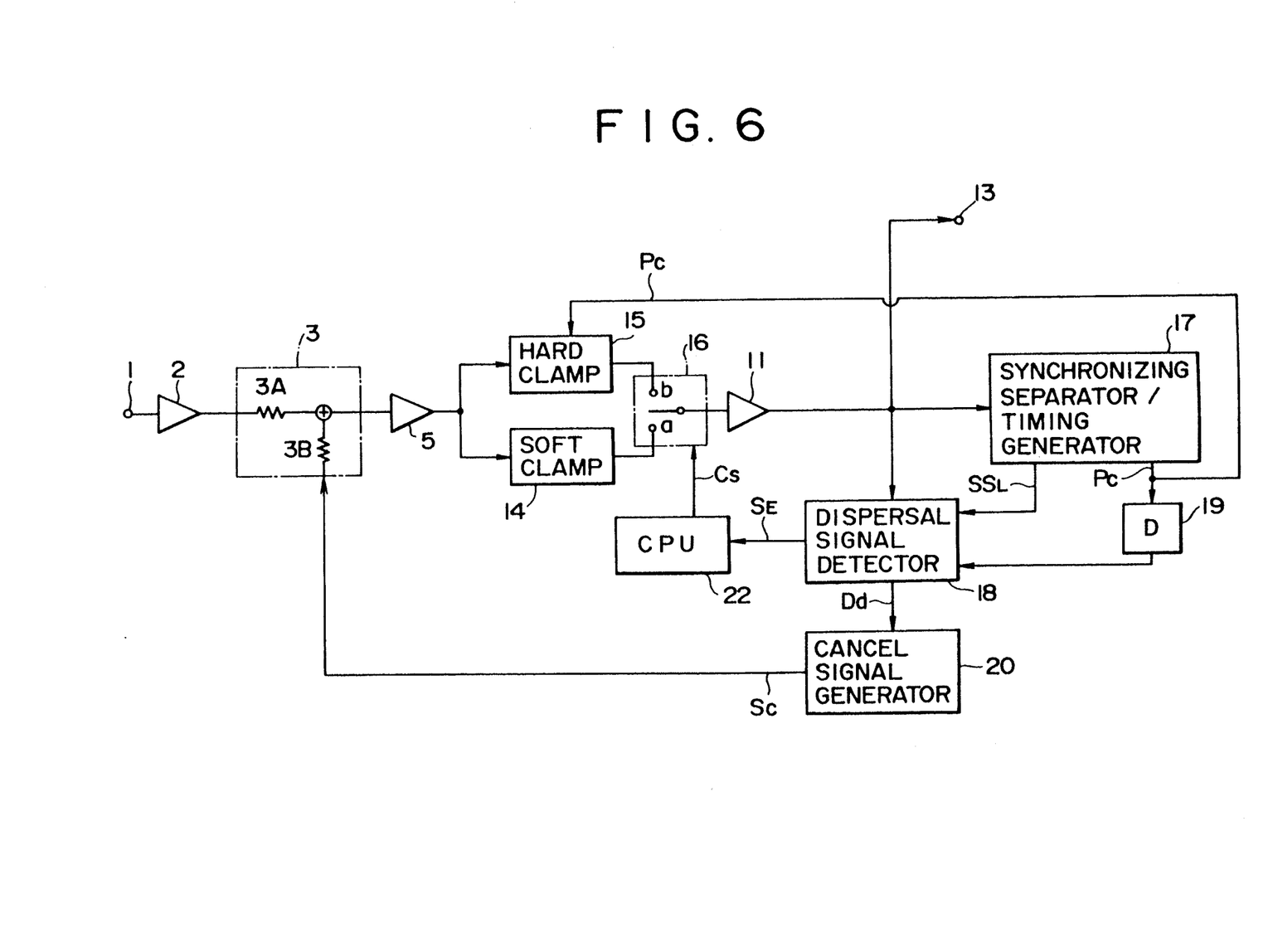
FIG. 6 is a block diagram of another dispersal signal removing apparatus showing a second preferred embodiment of the present invention.

FIG. 6 shows a dispersal signal removing apparatus according to a second preferred embodiment of the present invention. The dispersal signal removing apparatus is a modification to the dispersal signal removing apparatus of FIG. 1 and is realized entirely using analog circuit components. In this instance, a reception signal will be converted from an analog signal to a digital signal at the stage subsequent to the output terminal 13 and then supplied to a decoder.

Figure 7:
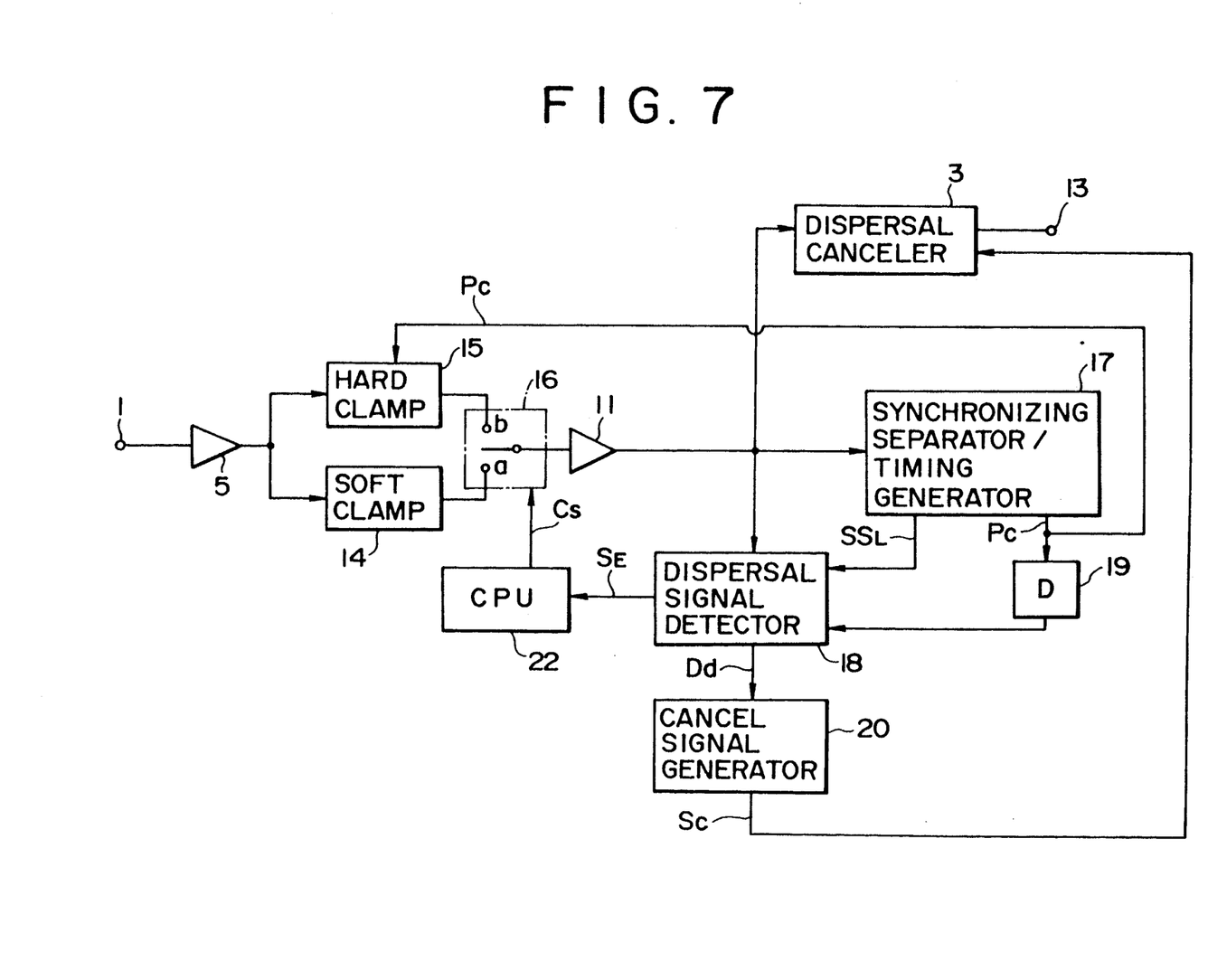
FIG. 7 is a block diagram of a further dispersal signal removing apparatus showing a third preferred embodiment of the present invention.
Figure 8A:
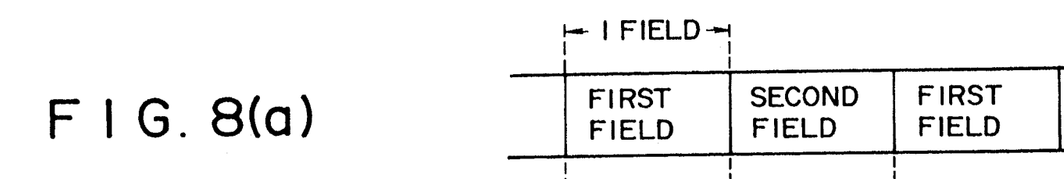
FIGS. 8(a)–8(e) are waveform diagrams showing dispersal signals and residual signal.
Figure 8B:
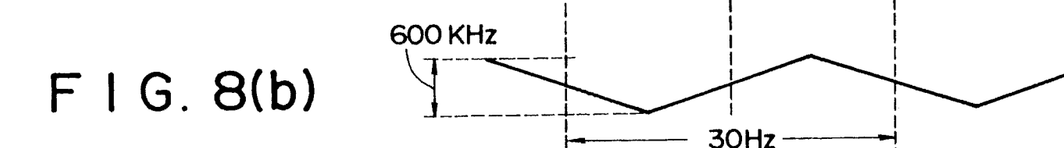
Figure 8C:
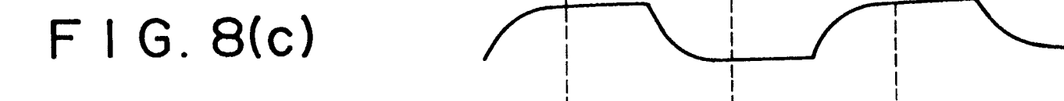
Figure 8D:
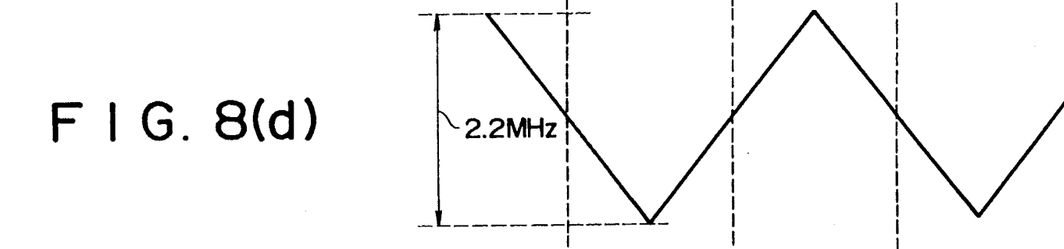
Figure 8E:
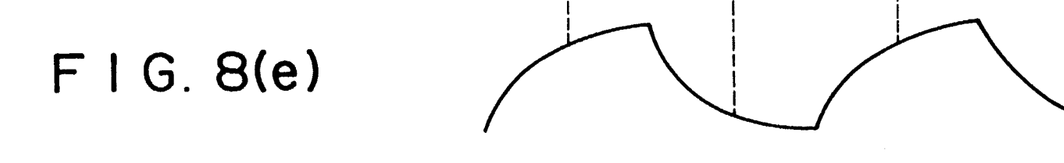

FIG. 7 shows a dispersal signal removing apparatus according to a third preferred embodiment of the present invention. The present dispersal signal removing apparatus is another modification to the dispersal signal removing apparatus of FIG. 1 and is only different in that the dispersal canceler 3 is disposed at the stage subsequent to the hard clamp circuit 15.

Also with the dispersal signal removing apparatus shown in FIGS. 6 and 7, effective removal of a dispersal signal can be achieved by similar operations to the operations the timings of which are described hereinabove with reference to FIG. 5. Naturally, various other circuit configurations may be available.

Having now fully described the invention, it will be apparent to one of ordinary skill in the art that many changes and modifications can be made thereto without departing from the spirit and scope of the invention as set forth herein.

What is claimed is:

1. An apparatus for removing a dispersal signal component from an input reception signal, said apparatus comprising:

dispersal canceler means receiving said input reception signal having said dispersal signal component for attenuating said dispersal signal component in response to receipt of a cancel signal and for supplying therefrom the input reception signal with an attenuated dispersal signal component, and, in the absence of receiving said cancel signal, for supplying the received input reception signal therefrom without attenuation of said dispersal signal component;

soft clamp means coupled to said dispersal canceler means for receiving the received input reception signal with said dispersal signal component and for supplying the same as an output signal therefrom without attenuating said dispersal signal component;

dispersal signal detecting means for receiving said output signal from said soft clamp means and for detecting therefrom the dispersal signal component;

cancel signal generating means for generating said cancel signal from the dispersal signal component detected by said dispersal signal detecting means;

hard clamp means coupled to said dispersal canceler means for receiving the input reception signal with said attenuated dispersal signal component and for further attenuating said dispersal signal component so as to produce an output reception signal; and switching means for initially coupling said soft clamp means to said dispersal signal detecting means and, in response to detection of the dispersal signal component by said dispersal signal detecting means, for disconnecting said dispersal signal detecting means from said soft clamp means and allowing removal of the dispersal signal component from the input reception signal by said dispersal canceler means and said hard clamp means so as to produce said output reception signal.

2. An apparatus for removing a dispersal signal component according to claim 1, further comprising an analog to digital converter interposed between said soft clamp means and said dispersal signal detecting means so that said dispersal signal detecting means and said cancel signal generating means operate digitally, and a digital to analog converter interposed between said cancel signal generating means and said dispersal canceler means.

3. An apparatus for removing a dispersal signal component according to claim 1, wherein said dispersal signal detecting means and said cancel signal generating means operate in an analog fashion.

4. An apparatus for removing a dispersal signal component according to claim 1, wherein said dispersal canceler means includes an input terminal for receiving said input reception signal having said dispersal signal component, a first resistor interposed between said input terminal and said soft clamp means and said hard clamp means, and a second resistor connected at one end thereof to said cancel signal generating means and at the other end thereof to a junction between said first resistor and said soft and hard clamp means.

5. An apparatus for removing a dispersal signal component from an input reception signal, said apparatus comprising:

soft clamp means for receiving the input reception signal and for supplying the same as an output signal therefrom without attenuating said dispersal signal component;

hard clamp means receiving the input reception signal for attenuating said dispersal signal component in the input reception signal and for supplying therefrom the input reception signal with an attenuated dispersal signal component;

dispersal signal detecting means for receiving said output signal from said soft clamp means and for detecting therefrom said dispersal signal component;

cancel signal generating means for generating a cancel signal from the dispersal signal component detected by said dispersal signal detecting means;

dispersal canceler means receiving the input reception signal with said attenuated dispersal signal component from said hard clamp means for further attenuating said dispersal signal component in accordance with said cancel signal from said cancel signal generating means so as to provide an output reception signal; and switching means for initially coupling said soft clamp means to said dispersal signal detecting means and, in response to detection of the dispersal signal component by said dispersal signal detecting means, for disconnecting said dispersal signal detecting means from said soft clamp means and allowing removal of the dispersal signal component from the input reception signal by said hard clamp means and said dispersal canceler means so as to produce said output reception signal.

* * * * *